(12) United States Patent  (10) Patent No.: US 7,558,987 B2
Nardini et al.  (45) Date of Patent: Jul. 7, 2009

(54) TOKEN-BASED TRACE SYSTEM

(75) Inventors: Lewis Nardini, Richardson, TX (US); Manisha Agarwala, Richardson, TX (US); Neil Common, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 346 days.

(21) Appl. No.: 11/468,114

(22) Filed: Aug. 29, 2006

(65) Prior Publication Data

US 2008/0126871 A1  May 29, 2008

(51) Int. Cl.
  *G06F 11/00* (2006.01)
(52) U.S. Cl. ....................................... 714/38
(58) Field of Classification Search ................ 714/38
  See application file for complete search history.

(56) References Cited

U.S. PATENT DOCUMENTS

| | | | |
|---|---|---|---|
| 5,737,516 A * | 4/1998 | Circello et al. ............... 714/38 |
| 5,964,893 A * | 10/1999 | Circello et al. ............... 714/39 |
| 6,065,078 A * | 5/2000 | Falik et al. .................. 710/100 |
| 6,430,727 B1 * | 8/2002 | Warren ........................ 716/4 |
| 6,598,177 B1 * | 7/2003 | Jones et al. ................. 714/30 |
| 6,675,284 B1 * | 1/2004 | Warren ........................ 712/38 |
| 7,003,698 B2 * | 2/2006 | Glass ........................... 714/30 |
| 7,010,722 B2 * | 3/2006 | Jahnke ......................... 714/30 |

* cited by examiner

*Primary Examiner*—Robert Beausoliel
*Assistant Examiner*—Elmira Mehrmanesh
(74) *Attorney, Agent, or Firm*—Mirna G. Abyad; Wade J. Brady, III; Frederick J. Telecky, Jr.

(57) ABSTRACT

A system comprising a target hardware comprising multiple processor cores and an application. The system also comprises a host computer coupled to the target hardware by way of a connection and adapted to debug the application by receiving trace information via the connection. In determining which trace information to send via the connection, the target hardware gives priority to trace information generated by a primary processor core associated with a token over trace information generated by a secondary processor core not associated with the token. The token is associated with one of the multiple processor cores at a time.

21 Claims, 3 Drawing Sheets

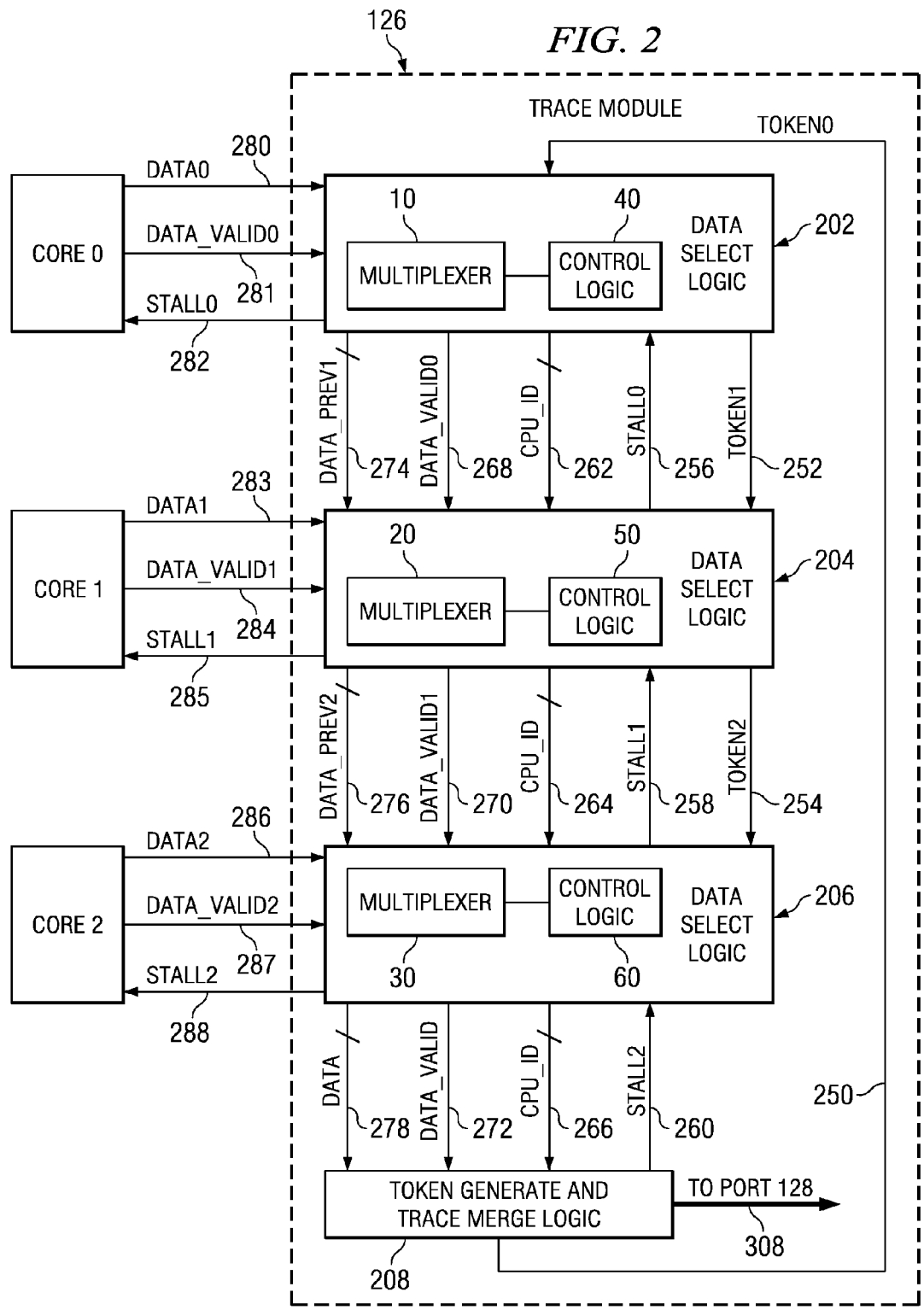

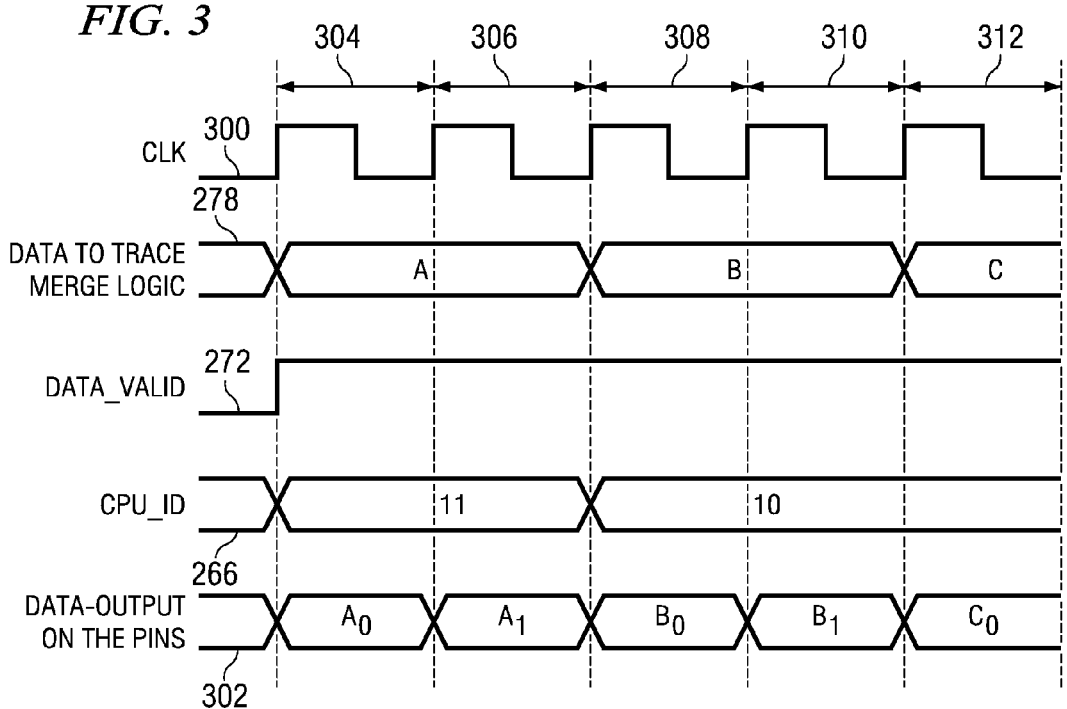
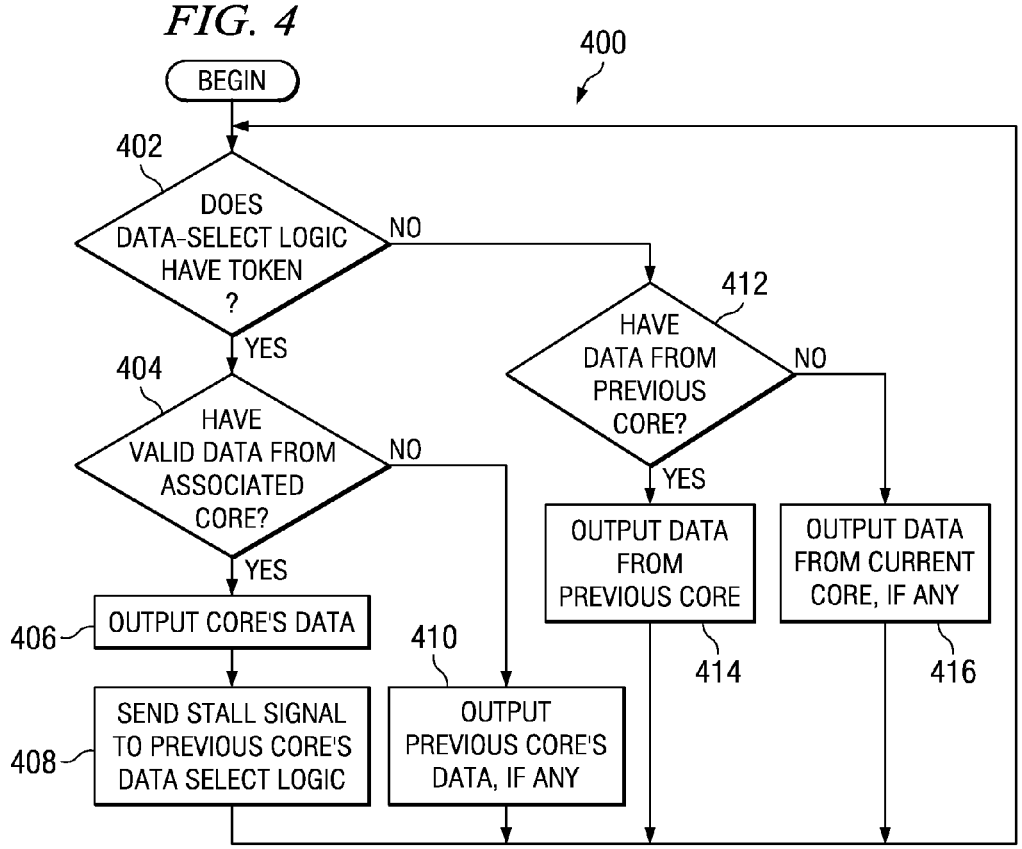

TOKEN-BASED TRACE SYSTEM

BACKGROUND

A software developer may use debugging software running on a host computer to test and debug an application stored on hardware coupled to the host computer. While the application is being tested and debugged, various information is transferred from the hardware to the host computer. In many cases, the hardware may comprise multiple processor cores, each core having information to transfer to the host computer. Improvements in techniques used to collect and transfer information from multiple processor cores are desirable.

SUMMARY

The problem noted above is solved in large part by a token-based trace system. An illustrative embodiment includes a system comprising a target hardware comprising multiple processor cores and an application. The system also comprises a host computer coupled to the target hardware by way of a connection and adapted to debug the application by receiving trace information via the connection. In determining which trace information to send via the connection, the target hardware gives priority to trace information generated by a primary processor core associated with a token over trace information generated by a secondary processor core not associated with the token. The token is associated with one of the multiple processor cores at a time.

Another illustrative embodiment includes system comprising first and second processor cores, a data select logic coupled to the processor cores, and a port coupled to the data select logic. The port is adapted to receive trace information from the data select logic and to output the trace information from the system. In determining the trace information to be sent to the port, the data select logic gives priority to valid trace information from a processor core associated with a token over valid trace information from a processor core not associated with the token.

Yet another illustrative embodiment includes method that comprises generating trace data using first and second processor cores and transferring at least some of the trace data to a port coupled to the processor cores. If the first processor core is associated with a token, the method includes giving priority to valid trace data from the first processor core over trace data from the second processor core in determining the trace data to be transferred to the port. One of the cores is associated with the token at a time.

BRIEF DESCRIPTION OF THE DRAWINGS

For a detailed description of exemplary embodiments of the invention, reference will now be made to the accompanying drawings in which:

FIG. 2 shows a detailed view of test hardware used in the testing system of FIG. 1, in accordance with preferred embodiments of the invention;

FIG. 3 shows a timing diagram associated with the test hardware of FIG. 2, in accordance with embodiments of the invention; and FIG. 4 shows a flow diagram of a method associated with the test hardware of FIG. 2, in accordance with embodiments of the invention.

NOTATION AND NOMENCLATURE

Figure 1:
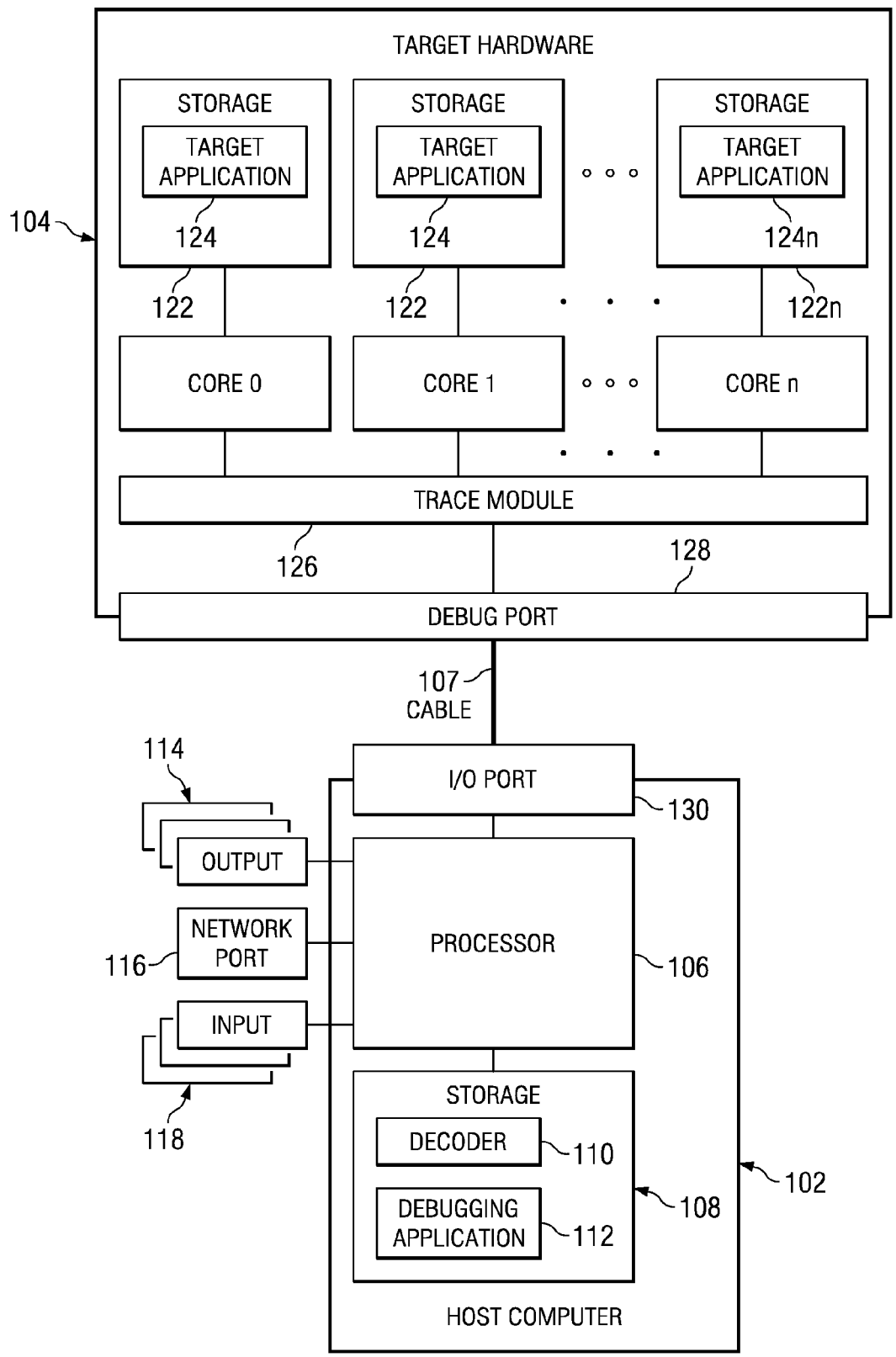
FIG. 1 shows a block diagram of a token-based system in accordance with embodiments of the invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows an illustrative testing system 100 in accordance with embodiments of the invention. The testing system 100 comprises a general purpose host computer 102 and target hardware 104 coupled via a cable 107. The cable 107 couples the input/output (I/O) port 130 of the host computer 102 with the debug port 128 of the target hardware 104. In at least some embodiments, the debug port 128 may include a Joint Test Action Group (JTAG) port, although the scope of disclosure is not limited as such. In some embodiments, the target hardware 104 may be, or may be incorporated into, a mobile communication device such as a mobile phone, a personal digital assistant (e.g., a BLACKBERRY®), or other type of electronic system. The target hardware 104 and the host computer 102 are now described in turn.

In some embodiments, the target hardware 104 comprises a megacell or a system-on-chip (SoC) which includes one or more control logic units such as processor cores 0, 1 . . . n. Each core may couple to a corresponding storage 122 (e.g., random access memory (RAM)), and each storage 122 may comprise a target application 124 (e.g., embedded application) which, when executed by a corresponding core, performs any suitable function associated with the target hardware 104. Alternatively, the cores may couple to a common storage comprising multiple target applications 124. When it executes a target application 124, each core produces trace information which is collected and transferred to the debug port 128 by a trace module 126, described in detail below. As described further below, the host computer 102 is used to test and/or debug the one or more target applications 124.

While a target application 124 is being debugged by the host computer 102, various information is transferred from a corresponding core to the host computer 102. Such information may include trace information. Trace information describes the various activities of the core as the core executes the target application 124. The trace information is provided so that a user of the host computer 102 can "step through" the software code of the target application 124 and determine how the core reacts to each line of code that is executed. The trace module 126 collects trace information output by the core, processes the trace information, and transfers the trace information to the host computer 102 via the cable 107. The host computer 102 is now described.

The host computer 102 comprises a processor 106 coupled to the I/O port 130. The processor 106 also couples to a storage medium 108, one or more output devices 114, one or more input devices 118, and a network port 116. The storage medium 108 may comprise volatile memory (e.g., RAM), non-volatile storage such as ROM, a hard disk, a CD-ROM, a flash drive, a floppy disk, a compact disc, and/or combinations thereof. The storage 108 stores a debugging application 112 and a decoder 110. The decoder 110 comprises a software decoder, although in some embodiments, a hardware decoder coupled to the processor 106 may be used instead. The input devices 118 may include any one or more of a keyboard, mouse, audio input device, touchpad, etc. The output devices 114 may include any one or more of a display, a printer, a storage device (e.g., a hard drive, flash drive), etc. The processor 106 may use the network port 116 to exchange information with another electronic device communicably coupled to the network port 116, such as another computer on an Internet or intranet network connection. For example, the network port 116 may be used to download the debugging application 112 onto the host computer 102.

The debugging application 112 is executed on the processor 106 and is used to test and/or debug the target application 124 on the target hardware 104. More specifically, when the processor 106 executes the debugging application 112, the processor 106 sends signals to and receives signals from the target hardware 104 via the cable 107 and the ports 130 and 128. Signals transferred from the host computer 102 to the target hardware 104 generally comprise test and debug signals, and signals transferred from the target hardware 104 to the computer 102 generally comprise response signals, including trace information. In this way, the target application 124 embedded on the target hardware 104 is tested and debugged using the application 112.

FIG. 2 shows an illustrative view of the trace module 126. The illustrative trace module 126, depicted in FIG. 2, comprises a token generate and trace merge logic (TGTML) 208 and a plurality of data select logic units 202, 204 and 206. Each data select logic preferably couples to a different processor core. In FIG. 2, data select logic 202 couples to core 0; data select logic 204 couples to core 1; and data select logic couples to core 2. In other embodiments, the trace module 126 may comprise more or fewer data select logic units. Preferably, the number of data select logic units in the trace module 126 corresponds to the number of processor cores on the target hardware 104.

Data (e.g., trace information collected from the processor cores) is transferred from the TGTML 208 to the port 128 for export to the host computer 102. The port 128 generally is a serial port capable of transferring the trace information of one core at a time. Described herein is a technique by which the limited bandwidth of the port 128 is used efficiently to transfer trace information from the TGTML 208 to the host computer 102, and from the host computer 102 to the TGTML 208.

In accordance with embodiments of the invention, the trace module 126 implements a token-based tracing technique by which trace data obtained from the processor cores 0, 1 and 2 is efficiently collected and transferred to the debug port 128. As described in detail below, possession of a "token" causes a core to give priority to its own data over the data of other cores when determining which data to pass to the port 128. Each of the cores may contain a storage (e.g., a register) having a token bit. Some embodiments may use a token byte, word, multiple bits, etc., but for the purposes of discussion, the token is hereinafter referred to as a "bit." Whether a core does or does not possess the token is determined by the status of its token bit. In some embodiments, the core that has the token has its token bit set to 1. For example, if core 0 has the token, its token bit may have a value of "1" while the token bits for the remaining cores have values of "0." In other embodiments, a token bit set to 0 means that core has the token. Thus, if core 0 has the token, its token bit may have a value of "0" while the token bits for the remaining cores have values of "1." In some embodiments, the token bits may be stored in the data select logic 202, 204 and 206 instead of in the cores 0, 1 and 2. In preferred embodiments, only one of the cores is associated with the token at a time.

In at least some embodiments, when a processor core is said to "have" the token or to be "associated with" the token, the token bit associated with that core is the opposite of the token bit associated with the remaining cores. For instance, if the data select logic 202 comprises a token bit that is the opposite of the token bits associated with the remaining cores, it may be said that core 0 "has" the token. It may also be said that core 0 is "associated with" the token. Likewise, it may be said that the data select logic 202 "has" the token, or that data select logic 202 is "associated with" the token. Likewise, if the core 0 comprises the token bit and the token bit has a value that is the inverse of the token bits associated with the remaining cores, it may be said that the core 0 "has" or is "associated with" the token. Likewise, it may be said that the data select logic 202 "has" or is "associated with" the token. Other synonymous terminology, such as "possess," "contain," etc., also may be used.

A token is generated by the TGTML 208 and is "passed" from the TGTML 208 to the data select logic unit 202. The data select logic unit 202 may pass the token to the data select logic 204, and the data select logic 204 may pass the token to the data select logic 206. In some embodiments, the token may be passed in reverse order. By "passing" the token, it is meant that a token signal connection between components in the trace module 126 is set to a specific bit value, and the remaining token signal connections between components in the module 126 is set to the inverse of the specific bit value. Thus, for instance, assume that a token bit value of "1" indicates possession of the token. If the core 0 has the token and passes the token to core 1, the TOKEN0 250 connection is forced to "0," the TOKEN1 252 connection is forced to "1," and the TOKEN2 254 connection is forced to "0." In this way, the token bits of cores 0 and 2 are set to "0," and the token bit of core 1 is set to "1," indicating that core 1 has possession of the token.

Each data select logic receives input signals from an associated processor core, and one or more of the data select logic units may receive additional input signals from one or more other data select logic units. One purpose of each data select logic unit is to determine which of the input signals should pass through (i.e., be output by) the data select logic. The decision as to which input signal(s) are output by a data select logic preferably depends on whether the data select logic has possession of the token. Because only a limited number of signals may be output by the data select logic, possession of the token enables each data select logic to give priority to data from its associated processor core over data from other sources when determining which one of the data inputs should be output by that data select logic. In some embodiments, the token comprises priority information which cause one processor or processor core to have priority over another processor or processor core.

Accordingly, each data select logic comprises a multiplexer and a control logic. As shown in FIG. 2, the data select logic 202 comprises a multiplexer 10 and a control logic 40; the data select logic 204 comprises a multiplexer 20 and a control logic 50; and the data select logic 206 comprises a multiplexer 30 and a control logic 60. Each multiplexer receives as input from the associated processor core a DATA signal (e.g., DATA0 280, DATA1 283, DATA2 286) comprising trace data and a DATA_VALID signal indicating whether the DATA signal is valid (e.g., DATA_VALID0 281, DATA_VALID1 284, DATA_VALID2 287). Some data select logic multiplexers receive input from other data select logic units, e.g., the multiplexer 20 receives as input from the data select logic 202 a DATA_PREV1 signal 274, a DATA_VALID0 signal 268, and a CPU_ID signal 262. In turn, the multiplexers output one or more of these signals. For instance, referring to FIG. 2, the multiplexer 10 of data select logic 202 receives as input the signal DATA_VALID0 281 and may output that signal as DATA_VALID0 268. Like other signals shown in FIG. 2, the signals DATA_VALID0 281 and DATA_VALID0 268 have different reference numerals for ease of discussion. However, these signals are identical.

As previously mentioned, the control logic of each data select logic assesses the presence or absence of a token and allows or blocks the passage of signals through the multiplexer accordingly. In accordance with preferred embodiments of the invention, if the control logic of a data select logic determines that the data select logic possesses the token, and if the control logic further determines that the DATA signal from the associated processor core contains valid data (i.e., using the DATA_VALID signal), the control logic allows the data from the associated processor core to pass through the multiplexer. In preferred embodiments, the control logic allows the data from the associated processor core to pass through the multiplexer even if valid data from other processor cores also are supplied to the multiplexer as input signals. In this way, priority is given to the data from the processor core associated with the control logic over data from other processor cores. If the control logic determines that the DATA signal from the associated processor core contains no valid data, then the data received from a different data select logic is output, if any. If the control logic determines that the data select logic does not have possession of the token, that the DATA signal from the associated processor core contains valid data, and that no valid data is received from a different data select logic, then the control logic permits the data from the associated processor core to pass through the multiplexer. However, if the control logic determines that valid data is received from a preceding data select logic, the control logic permits the data from the preceding select logic to pass through the multiplexer instead of data from the associated processor core.

For example, referring to the data select logic 202 and the core 0, the core 0 provides data on DATA0 280 to the data select logic 202. The DATA_VALID0 signal 281 indicates whether the data on DATA0 280 is valid. Assume that the DATA_VALID0 281 indicates that the data on DATA0 280 is valid. If the control logic 40 in the data select logic 202 determines that the data select logic 202 possesses the token, the control logic 40 allows the data on DATA0 280 to pass through the multiplexer 10. The data on DATA0 280 is output by the data select logic 202 on signal connection DATA_PREV1 274. The connection DATA_VALID0 274 indicates that the data on DATA_PREV1 274 is valid. The connection CPU_ID 262 carries a set of bits which identifies the processor core in which the data on the DATA_PREV1 connection 274 was generated. After passing the data through the multiplexer 10, the control logic 40 may choose to either forward the token to the data select logic 204 or to retain the token until additional data from the core 0 has been output by the data select logic 202.

Continuing with the above example, the core 1 provides data on DATA1 283 to the data select logic 204. The DATA_VALID1 284 indicates whether the data on DATA1 283 is valid. The data select logic 204 also receives DATA_PREV1 274, DATA_VALID0 268 and CPU_ID 262 as input. Assuming the data select logic 202 passes the token to the data select logic 204, the control logic 50 in the data select logic 204 checks DATA_VALID1 284 to determine whether the data on DATA1 283 is valid. If DATA_VALID1 284 indicates the data on DATA1 283 is valid, the data on DATA1 283 is passed through the multiplexer 20 of data select logic 204, and is output on the connection DATA_PREV2 276. The DATA_VALID1 270 indicates that the data on DATA_PREV2 276 is valid. Because the data from core 1 is output by the data select logic 204 instead of the data forwarded by the data select logic 202 on DATA_PREV1 274, the data select logic 204 transfers to the logic 202 a stall signal on STALL0 256. The logic 202 forwards the stall signal to the core 0 on STALL0 282. The stall signal indicates that the data select logic 204 was unable to output the data on DATA_PREV1 274, and that the data select logic 202 should refrain from passing additional data through its multiplexer 10 until the stall signal is deactivated. In this way, the data on DATA_PREV1 274 is protected from being overwritten with new data output by the data select logic 202.

Continuing with the above example and still assuming that the data select logic 202 forwarded the token on TOKEN1 252 to the data select logic 204, if the control logic 50 of data select logic 204 checks DATA_VALID1 284 and determines that the data on DATA1 283 is invalid, the control logic 50 may allow the data waiting on DATA_PREV1 274 to pass through the multiplexer 20. This data is output by the data select logic 204 on connection DATA_PREV2 276. The validity of this data is confirmed on DATA_VALID1 270, and CPU_ID 264 carries an identifier associated with core 0, since core 0 generated the data that is now present on DATA_PREV2 276. Because the data select logic 204 forwarded the data present on DATA_PREV1 274 instead of the data present on DATA1 283, a stall signal is not sent on STALL0 256.

Still continuing with the above example, assume now that the data select logic 202 did not forward the token to the data select logic 204. In such a case, because the data select logic 204 does not possess the token, the data select logic 204 may no longer give priority to data from core 1 over data present on DATA_PREV1 274 when determining which data may pass through the data select logic 204. Thus, if the control logic 50 of data select logic 204 checks DATA_VALID1 284 and determines that the data on DATA1 283 is valid, and further if the control logic 50 checks DATA_VALID0 268 and determines that the data on DATA_PREV1 274 also is valid, the control logic 50 preferably allows the data on DATA_PREV1 274 to pass through the data select logic 204. The data present on DATA1 283 must "wait" until the next opportunity (e.g., clock cycle) to be output by the data select logic 204.

Still continuing with the above example and still assuming that the data select logic 204 does not possess the token, if the control logic 50 of the data select logic 204 checks the DATA_VALID1 284 and the DATA_VALID0 268 and determines that the data on DATA1 283 is valid but that the data on DATA_PREV1 274 is invalid, the control logic 50 preferably allows the data on DATA1 283 to pass through the data select logic 204. In such a case, the control logic 50 may send a stall signal to the data select logic 202 on STALL0 256. The data select logic 202 preferably forwards the stall signal to core 0 via STALL0 282. For brevity, the operations of core 2 and data select logic 206 are not specifically discussed, since the operations of core 2 and data select logic 206 are similar to those of core 1 and data select logic 204 and to those of core 0 and data select logic 202.

In preferred embodiments, each data select logic is able to retain a token as long as necessary to accomplish a specific task. For example, if it is necessary to empty a core data buffer, an associated data select logic may retain the token until the buffer has been emptied. Connections between cores and data select logic units in excess of those shown in FIG. 2 may be used to accommodate various such token-passing protocols.

The TGTML 208 preferably receives from data select logic 206 at least three signals: a DATA signal 278, a DATA_VALID signal 272 which indicates the validity or invalidity of data on DATA 278, and a CPU_ID 266 which indicates the processor core that generated the data on DATA 278. As the TGTML 208 receives and accumulates data from the chain of data select logic units 202, 204 and 206, the TGTML 208 prepares the data for transmission to the host computer 102 and sends the data to the debug port 128.

FIG. 3 shows a timing diagram illustrative of the operation of TGTML 208. Shown on the timing diagram are a clock (CLK) signal 300 (e.g., generated by a clock, not specifically shown, on the TGTML 208), data received on DATA 278, data validity information received on DATA_VALID 272, processor core identification information received on CPU_ID 266, and data 302 output by the TGTML 208 to the debug port 128. The periods of the CLK signal 300 have been labeled 304, 306, 308, 310 and 312. The data train present on DATA 278 comprises data blocks A, B and C. Assume each data block A, B and C is 20 bits wide. As indicated by DATA_VALID 272, all data present in data blocks A, B and C is valid. As indicated in CPU_ID 266, data block A was generated in the processor core associated with an ID of "1 1," (e.g., core 0), data block B was generated in the processor core associated with an ID of "1 0" (e.g., core 1), and data block C was generated in the core associated with an ID of "1 0" (e.g., core 1).

Assume the debug port 128 comprises 12 pins with which trace information may be transferred to the host computer 102 at a time. Accordingly, the debug port 128 can handle a maximum of 12 bits at a time. Thus, as shown in FIG. 3, the data 302 output to the debug port 128 is divided into portions small enough for the port 128 to process. Data block A is 20 bits wide, so the TGTML 208 divides block A into sub-blocks $A_0$ and $A_1$, each sub-block being only 10 bits wide. $A_0$ is transferred to the debug port's pins during period 304, and $A_1$ is transferred to the debug port's pins during period 306. Likewise, the TGTML 208 divides block B into sub-blocks $B_0$ and $B_1$, where $B_0$ is transferred to the debug port's pins during period 308, and $B_1$ is transferred to the debug port's pins during period 310. Block C is divided into sub-blocks $C_0$ (transferred to the debug port's pins during period 312) and $C_1$ (not specifically shown), etc. Prior to transferring each sub-block to the debug port 128, the TGTML 208 tags the sub-block with a corresponding CPU ID. Thus, for example, sub-block $A_0$ is tagged with the CPU ID "1 1." By tagging each sub-block with these two additional bits, the total number of bits per sub-block is 12. In this example, the debug port 128 has 12 pins available for transferring trace information to the host computer 102 at a time. Because the debug port 128 has 12 pins and each sub-block is 12 bits wide, the debug port 128 is capable of simultaneously transferring all 12 bits (data and CPU ID) to the host computer 102. The host computer 102 then may use the CPU ID packaged with each sub-block to group the data of that sub-block with other data from the same processor core. In this way, trace information is "re-assembled" on the host computer 102.

Although FIG. 3 shows a new sub-block of data (e.g., $A_0$, $A_1$, $B_1$) being transferred with the rise of each pulse of CLK signal 300, the scope of disclosure is not limited as such. In various embodiments, for example, the sub-blocks of data may be center-aligned or edge-aligned with the CLK signal 300. In other embodiments, a free-running CLK signal may be used. In yet other embodiments, clock changes may occur only when valid data is present. Further, although the above example describes the sub-blocks as having 12 bits and the debug port 128 as having 12 pins for each sub-block, the scope of disclosure is not limited to any specific sub-block size or any particular quantity of pins on the debug port 128. The TGTML 208 may partition each data block A, B, C, etc. into sub-blocks having sizes that are appropriate for the number of pins available on the debug port 128 for data output.

As described above, in some embodiments, the sub-blocks of data output by the TGTML 208 may be transferred to the output pins of the debug port 128. However, in other embodiments, the sub-blocks of data output by the TGTML 208 may instead be transferred to a memory local to the target hardware 104 for storage. In yet other embodiments, the data output by the TGTML 208 may be transferred to the host computer 102 via the pins on debug port 128, and a copy of the data output by the TGTML 208 may be stored to a memory.

FIG. 4 shows a flow diagram of a method 400 associated with the token-based system described above. Preferably, the method 400 is simultaneously performed at each data select logic (shown in FIG. 2). The method 400 begins by determining whether the data select logic possesses the token (block 402). If the logic possesses the token, the method 400 then comprises determining whether the data select logic is provided with valid data from an associated core (block 404). If the data select logic is provided with valid data from an associated core, the method 400 further comprises providing as output data generated by the associated core (block 406) and sending a stall signal to the data select logic of a preceding core, if applicable (block 408). However, if the data select logic is not provided with valid data from an associated core, the method 400 comprises providing as output data generated by a core associated with a preceding data select logic, if any (block 410).

If the data select logic does not possess the token (block 402), the method 400 comprises determining whether the data select logic is provided with data generated by a core associated with a preceding data select logic (block 412). If so, the method 400 comprises providing as output the data from the preceding data select logic (block 414). If not, the method 400 comprises providing as output data from a core associated with the data select logic, if any (block 416).

The scope of disclosure is not limited to the views described above. Numerous variations and modifications will become apparent to those skilled in the art once the above disclosure is fully appreciated. It is intended that the following claims be interpreted to embrace all such variations and modifications.

What is claimed is:

1. A testing system, comprising:
 a target system comprising:
 a first processor core configured to generate first trace data wherein the first trace data describes actions of the first processor core as the first processor core executes, a first data select logic unit coupled to the first processor core to receive the first trace data, a second processor core configured to generate second trace data, wherein the second trace data describes actions of the second processor core as the second processor core executes, and a second data select logic unit coupled to the second processor core to receive the second trace data and coupled to the first data select logic unit to receive the first trace data; and a host computer coupled to the target system by way of a connection and adapted to debug an application executing on the first processor core and the second processor core using the first trace data and the second trace data received via the connection;

wherein the target system is configured to send trace data via the connection to the host computer by a method comprising:

determining by the second data select logic whether the second processor core has a token, wherein the token assigns priority to valid trace data from a processor core having the token and wherein only one processor core has the token at a time, and when the second processor core has the token and the second trace data is valid, transmitting the second trace data, and sending a stall signal to the first processor core to indicate that the first trace data was not transmitted.

2. The testing system of claim 1, wherein the second data logic unit passes the token to another processor core when the second processor core has the token.

3. The testing system of claim 1, wherein the method further comprises:

when the second processor core does not have the token and the first trace data is valid, transmitting the first trace data.

4. The testing system of claim 1, wherein the method further comprises:

when the second processor core has the token, the second trace data is invalid, and the first trace data is valid, transmitting the first trace data.

5. The testing system of claim 1, wherein the method further comprises:

when the second processor core does not have token, the second trace data is valid, and the first trace data is invalid, transmitting the second trace data.

6. The testing system of claim 1, wherein transmitting the second trace data further comprises transmitting the second trace data to the connection.

7. The testing system of claim 1, wherein transmitting the second trace data further comprises transmitting the second trace data to another data logic unit in the target system.

8. A system, comprising:

a first processor core configured to generate first trace data, wherein the first trace data describes actions of the first processor core as the first processor core executes;

a first data select logic unit coupled to the first processor core to receive the first trace data;

a second processor core configured to generate second trace data, wherein the second trace data describes actions of the second processor core as the second processor core executes; and a second data select logic unit coupled to the second processor core to receive the second trace data and coupled to the first data select logic unit to receive the first trace data, wherein the second data select logic unit is configured to:

determine whether the second processor core has a token, wherein the token assigns priority to valid trace data from a processor core having the token and wherein only one processor core has the token at a time, and when the second processor core has the token and the second trace data is valid, transmit the second trace data, and send a stall signal to the first processor core to indicate that the first trace data was not transmitted.

9. The system of claim 8, wherein the second data logic unit is further configured to transfer the token to another processor core when the second processor core has the token.

10. The system of claim 8, wherein the second data logic unit is further configured to:

when the second processor core does not have the token and the first trace data is valid, transmit the first trace data.

11. The system of claim 8, wherein the second data logic unit is further configured to:

when the second processor core has the token, the second trace data is invalid, and the first trace data is valid, transmit the first trace data.

12. The system of claim 8, wherein the second data logic unit is further configured to:

when the second processor core does not have token, the second trace data is valid, and the first trace data is invalid, transmit the second trace data.

13. The system of claim 8, further comprising:

a port coupled to the second data logic unit and configured to transfer trace data out of the system, and wherein the second data logic unit is further configured to transmit the second trace data to the port.

14. The system of claim 8, wherein the second data logic unit is further configured to transmit the second trace data to another data logic unit.

15. A method, comprising:

receiving first trace data from a first data select logic unit corresponding to a first processor core in a second data select logic unit corresponding to a second processor core;

receiving second trace data from the second processor core in the second data select logic unit concurrently with receiving the trace data from the first data select logic;

determining by the second data select logic whether the second processor core has a token, wherein the token assigns priority to valid trace data from a processor core having the token and wherein only one processor core has the token at a time; and when the second processor core has the token and the second trace data is valid, transmitting the second trace data, and sending a stall signal to the first processor core to indicate that the first trace data was not transmitted, wherein the first trace data and the second trace data describe actions of the respective first and second processor cores as the processor cores execute.

16. The method of claim 15, further comprising:

sending the token by the second data select logic unit to another data select logic unit, wherein a processor cor responding to the another data select logic unit has the token after the token is received by the another data select logic unit.

17. The method of claim 15, further comprising:

when the second processor core does not have the token and the first trace data is valid, transmitting the first trace data.

18. The method of claim 15, further comprising:

when the second processor core has the token, the second trace data is invalid, and the first trace data is valid, transmitting the first trace data.

19. The method of claim 15, further comprising:

when the second processor core does not have token, the second trace data is valid, and the first trace data is invalid, transmitting the second trace data.

20. The method of claim 15, wherein transmitting the second trace data further comprises transmitting the second trace data to a port for transfer to a host computer.

21. The method of claim 15, wherein transmitting the second trace data further comprises transmitting the second trace data to another data logic unit.

\* \* \* \* \*